United States Patent [19]
Bellinger et al.

[11] Patent Number: 5,564,999
[45] Date of Patent: Oct. 15, 1996

[54] METHOD AND APPARATUS FOR GEAR DOWN OPERATION PREVENTION

[75] Inventors: Steven M. Bellinger; Thomas A. Dollmeyer, both of Columbus; Lloyd E. Flory, Edinburgh; Matthew W. Workman, Indianapolis, all of Ind.

[73] Assignee: Cummins Engine Company, Inc., Columbus, Ind.

[21] Appl. No.: 483,253

[22] Filed: Jun. 7, 1995

[51] Int. Cl.$^6$ .................................................. B60K 41/06
[52] U.S. Cl. ............................................................ 477/111
[58] Field of Search ............................................... 477/111

[56] References Cited

U.S. PATENT DOCUMENTS

| | | | |
|---|---|---|---|
| 4,198,882 | 4/1980 | Kiencke et al. | 74/866 |
| 4,208,925 | 6/1980 | Miller et al. | 74/866 |
| 4,517,646 | 5/1985 | Magnusson et al. | 364/424.1 |
| 4,550,596 | 11/1985 | Ueda | 73/117.3 |
| 4,723,215 | 2/1988 | Hibimo et al. | 364/442 |
| 4,731,727 | 3/1988 | Rauch et al. | 364/442 |
| 4,752,883 | 6/1988 | Asakura et al. | 364/424.1 |
| 4,843,550 | 6/1989 | Kawanabe et al. | 364/424.1 |
| 4,868,756 | 9/1989 | Kawanabe et al. | 364/442 |
| 5,027,770 | 7/1991 | Yano et al. | 477/111 |
| 5,035,160 | 7/1991 | Morita | 74/866 |
| 5,048,372 | 9/1991 | Sodeno et al. | 477/111 |
| 5,105,357 | 4/1992 | Steeby | 364/424.1 |
| 5,129,288 | 7/1992 | Sasaki et al. | 74/866 |
| 5,226,351 | 7/1993 | Matsuoka et al. | 74/866 |
| 5,241,476 | 8/1993 | Benford et al. | 364/424.1 |
| 5,305,213 | 4/1994 | Boardman et al. | 364/424.1 |
| 5,319,555 | 6/1994 | Iwaki et al. | 364/424.1 |
| 5,323,318 | 6/1994 | Hasegawa et al. | 364/424.1 |
| 5,335,566 | 8/1994 | Genise et al. | 477/124 |
| 5,337,239 | 8/1994 | Okuda | 364/424.1 |
| 5,389,051 | 2/1995 | Hirate et al. | 477/111 |

*Primary Examiner*—Dirk Wright
*Attorney, Agent, or Firm*—Woodard, Emhardt, Naughton Moriarty & McNett

[57] ABSTRACT

The present invention allows the vehicle to be operated at higher than normally desired speeds during periods when there is a legitimate need for increased performance, such as downshifting in order to aid in climbing an uphill grade or accelerating with the goal of upshifting. Like the prior art systems, the present invention also imposes a maximum vehicle speed for all non-top gears, but only during steady state conditions (defined as a light engine load existing for a predetermined period of time). During transient conditions (discerned by recognizing gear changes and by high engine load conditions), the control system of the present invention provides lenience from the normal maximum vehicle speed limits for non-top gears. Such lenience provides for increased vehicle performance during periods when it is legitimately needed by the driver. During steady state conditions, the present invention prevents the use of non-top gear during high vehicle speed driving by limiting the vehicle road speed if the transmission is not in top gear.

20 Claims, 4 Drawing Sheets

1

METHOD AND APPARATUS FOR GEAR DOWN OPERATION PREVENTION

TECHNICAL FIELD OF THE INVENTION

The present invention generally relates to vehicle engine and transmission controls and, more particularly, to a method and apparatus for gear down operation prevention.

BACKGROUND OF THE INVENTION

Many vehicles, particularly trucks having large hauling capacity, employ manual transmissions in their drivetrains. Such transmissions allow the vehicle operator to manually select one of several available gear ratios for use in transitioning between the speed of the engine and the vehicle road speed. For any given vehicle road speed, the selected gear ratio determines the engine speed. For example, suppose a vehicle having a road speed of 65 miles per hour (mph) may be operated in either ninth or tenth gear (the convention used throughout the present application is that a "lower" gear has a numerically higher gear ratio than a "higher" gear, hence a transmission's "first gear" will have the numerically highest gear ratio of all of the gears in the transmission). In the case, the engine speed when the transmission is in ninth gear will be greater than the engine speed when the transmission is in tenth gear, for any given vehicle road speed.

The selection of the engine speed for any given vehicle road speed has several important consequences. First, optimum fuel economy results from achieving highway speeds at relatively low engine speeds. Therefore, the highest possible gear should be selected at any given vehicle road speed if the desired result is maximum fuel economy. This is because the higher gear will result in a lower engine speed, and therefore better fuel economy.

Second, vehicle performance is also directly related to engine speed. Generally, the horsepower output of an internal combustion engine will increase with increasing engine speed (up to a relatively very high engine speed, at which point it will begin to decrease with increasing engine speed). Therefore, the lowest possible gear should be selected (while still maintaining the engine speed within its normal operating speed range) at any given vehicle road speed if the desired result is maximum performance.

It will be appreciated by those skilled in the art that maximum fuel economy and maximum engine performance are mutually exclusive goals. This presents a problem in the situation where the owner of a truck desires that the truck be operated in such a way as to maximize fuel economy, while the driver of the truck (the owner's employee) desires to operate the truck so as to maximize performance. Because such owners have no physical control over their drivers while they are operating their trucks, owners desire that the trucks be designed so as to automatically limit vehicle speed independent of the driver's wishes in an effort to improve fuel economy.

Prior art solutions to this problem utilize a control system which imposes a maximum vehicle speed limit for gears lower than top gear (i.e. gears with numerically higher ratios than top gear). Thus, if the vehicle is not in top gear( gear down operation), the control system will not allow the vehicle speed to increase beyond the limit for that gear. These prior art solutions do not allow proper operation of the vehicle during periods of legitimately high vehicle speed when not in top gear, such as when downshifting on uphill grades or when accelerating with the goal of upshifting.

There is therefore a need in the prior art for a control system which will limit the driver's ability to operate the vehicle at high speed when not in the top gear, but which will also allow operation of the vehicle in legitimate high speed/ non-top gear driving maneuvers. The present invention is directed toward meeting this need.

SUMMARY OF THE INVENTION

Unlike the prior art control systems which attempt to maximize fuel economy at the expense of vehicle performance by imposing fixed vehicle speed limits for all non-top gears, the present invention allows the vehicle to be operated at higher than normally desired speeds during periods when there is a legitimate need for increased performance. For example, legitimate high speed scenarios include downshifting in order to aid in climbing an uphill grade or accelerating with the goal of upshifting. Like the prior art systems, the present invention also imposes a maximum vehicle speed for all non-top gears, but only during steady state conditions (defined as a light engine load existing for a predetermined period of time). Unlike the prior art control systems, during transient conditions (discerned by recognizing gear changes and by high engine load conditions), the control system of the present invention provides lenience from the normal maximum vehicle speed limits for non-top gears. Such lenience provides for increased vehicle performance during periods when it is legitimately needed by the driver. During steady state conditions, the present invention prevents the use of non-top gear during high vehicle speed driving by limiting the vehicle road speed if the transmission is not in top gear.

In one form of the invention, a method for gear down operation prevention in a vehicle having a drive train including an internal combustion engine and a manual transmission is disclosed, comprising the steps of: (a) determining if a numerically lowest gear ratio of the manual transmission is currently selected; (b) determining a load percentage of the engine; (c) determining if the load percentage of the engine is below a predetermined threshold; and (d) reducing a road speed limit of the vehicle if the numerically lowest gear ratio is not currently selected and the requested load percentage is below the threshold.

In another form of the invention, a method for gear down operation prevention in a vehicle having a drive train including an internal combustion engine and a manual transmission is disclosed, comprising the steps of: (a) determining if a numerically lowest gear ratio of the manual transmission is currently selected; (b) determining a load percentage of the engine; (c) filtering the load percentage to obtain a filtered load percentage, wherein the filtered load percentage is a weighted average of the load percentage over a period of time; (d) determining if the filtered load percentage is below a first predetermined threshold; (e) reducing a road speed limit of the vehicle by a predetermined amount if the numerically lowest gear ratio is not currently selected and the filtered load percentage is below the first threshold; (f) further reducing the road speed limit of the vehicle by the predetermined amount; and (g) repeating step (f) until the road speed limit of the vehicle reaches a predetermined limit speed.

In another form of the invention, an apparatus for gear down operation prevention in a vehicle having a drive train including an internal combustion engine and a manual transmission is disclosed, comprising gear ratio means for determining if a numerically lowest gear ratio of the manual transmission is currently selected; load percentage means for determining a load percentage of the engine; means for determining if the load percentage of the engine is below a predetermined threshold; and means for reducing a road speed limit of the vehicle if the numerically lowest gear ratio is not currently selected and the requested load percentage is below the threshold.

DETAILED DESCRIPTION OF THE PREFERRED EMBODIMENTS

Figure 1:
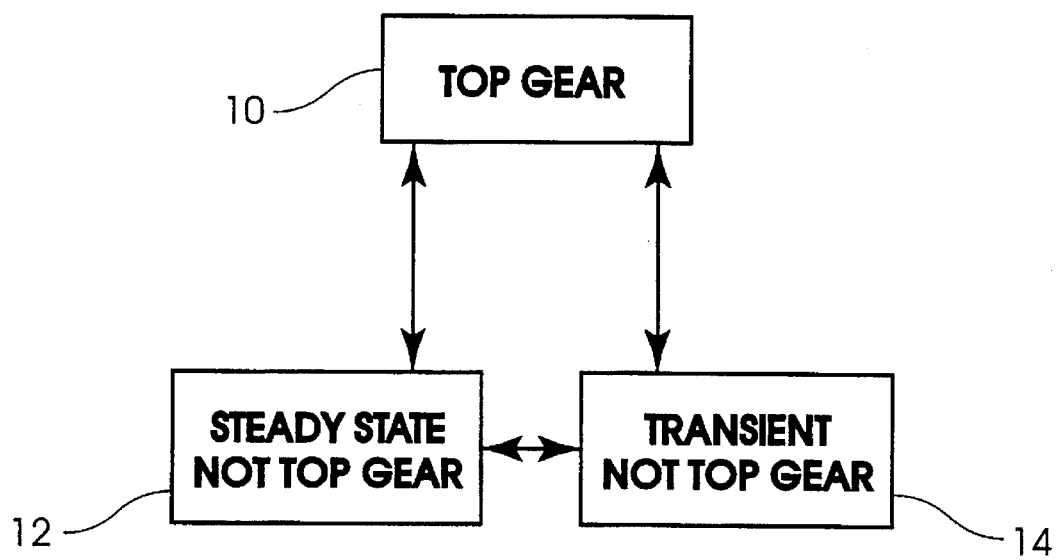
FIG. 1 is a schematic diagram of a vehicle cycle of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Unlike the prior art control systems which attempt to maximize fuel economy at the expense of vehicle performance by imposing fixed vehicle speed limits for all non-top gears, the present invention allows the vehicle to be operated at higher than normally desired speeds during periods when there is a legitimate need for increased performance. For example, legitimate high vehicle speed scenarios include downshifting in order to aid in climbing an uphill grade or accelerating with the goal of upshifting. Like the prior art systems, the present invention also imposes a maximum vehicle speed for all non-top gears, but only during steady state conditions (defined as a light engine load existing for a predetermined period of time). Unlike the prior art control systems, during transient conditions (discerned by recognizing gear changes and by high engine load conditions), the control system of the present invention provides lenience from the normal maximum vehicle speed limits for non-top gears. Such lenience provides for increased vehicle performance during periods when it is legitimately needed by the driver. During steady state conditions, the present invention prevents the use of non-top gear during high vehicle speed driving by limiting the vehicle road speed if the transmission is not in top gear.

The invention operates by limiting road speed to a low enough value that the driver is encouraged to shift to top gear in order to travel at the desired higher speed (in steady state conditions). Because the control system may be programmed to select the amount of lenience or the maximum vehicle speed for each gear, these quantities may be selected independently of the driver and therefore vehicle operation can be controlled to a limited extent in order to improve fuel economy.

Referring to FIG. 1, there is illustrated a schematic diagram of the vehicle operation cycle utilized by the control system of the present invention. Box 10 represents the vehicle operated in top gear during all conditions. Box 12 represents the vehicle when it is being operated in a non-top hear under steady state conditions, while box 14 represents the vehicle being operated in non-top gear in transient conditions. The arrows in FIG. 1 represent the various paths which may be traversed when transitioning between one vehicle operating state and another. As will be appreciated by those skilled in the art, the vehicle cycle illustrated in FIG. 1 recognizes only a single state when the vehicle is in top gear, however two separate states have been recognized when the vehicle is in a non-top gear, namely a steady state condition and a transient condition. It is the recognition of steady state and transient operating conditions which allows the control system of the present invention to provide lenience from the maximum engine speed limits when such lenience is required during legitimate requests for increased engine performance.

Specifically, operation of the vehicle in non-top gear, steady state high speed conditions (box 12) results in the control system limiting road speed, thus encouraging the driver to shift into top gear (box 10). On the other hand, operation of the vehicle in non-top gear, transient high speed conditions (box 14) will be allowed by the control system (up to a maximum high limit m.p.h.) for as long as the transient conditions persist. However, once the transient conditions disappear and the vehicle moves into a steady state condition (movement to box 12), the control system will once again operate to limit road speed until the transmission is shifted into top gear (box 10).

Figure 2:
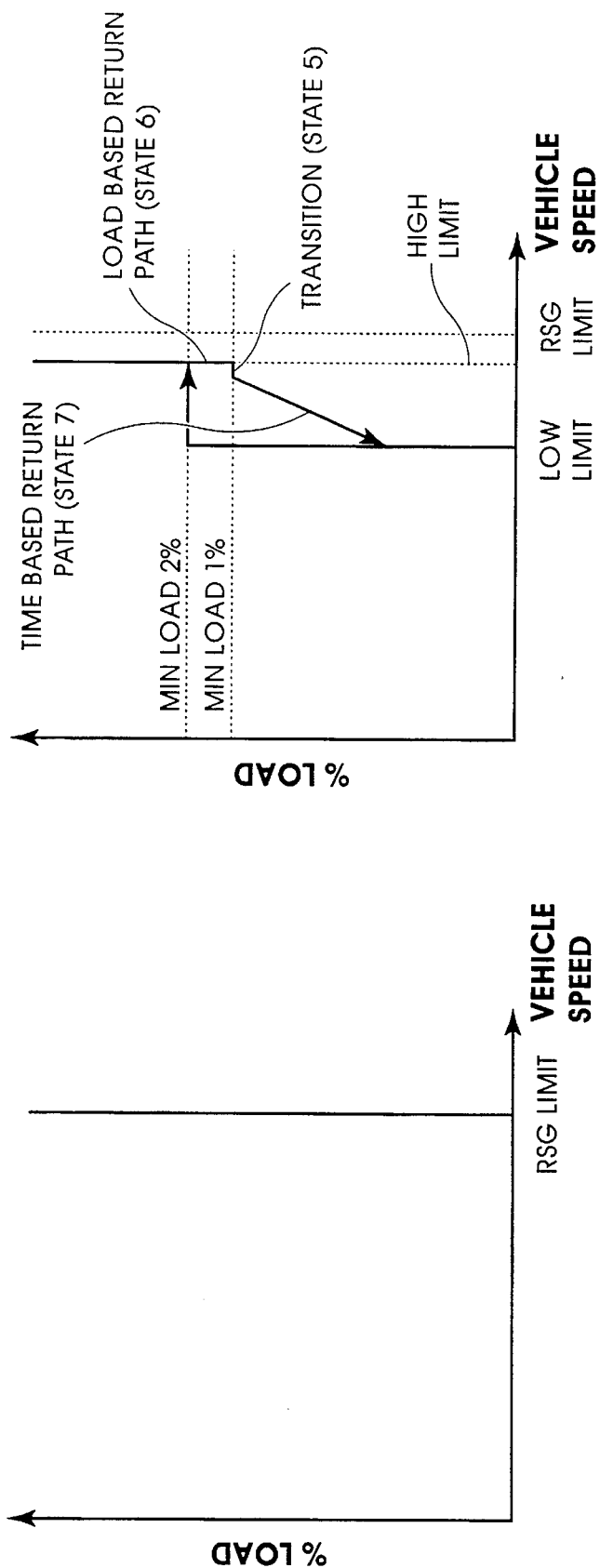
FIG. 2A is a graph illustrating vehicle road speed limit imposed by the present invention when the vehicle is in top gear.
FIG. 2B is a graph showing the vehicle road speed limit imposed by the present invention when the vehicle is not in top gear.

Referring now to FIG. 2A, there is illustrated a graph of the vehicle speed limit versus percent of maximum engine load when the transmission is in top gear (box 10 of FIG. 1). It will be appreciated by those skilled in the art that in top gear, the only limit on vehicle speed is the road speed governor (RSG) limit. The shape of the RSG limit graph need not be linear and is not important to the present invention.

Referring now to FIG. 2B, there is illustrated a graph of the vehicle speed limit versus percent of maximum engine load when the transmission is in a non-top gear (gear down operation). In this condition, the vehicle speed limit imposed by the control system of the present invention varies depending upon the percent load and also upon whether the control system is active in limiting road speed. These two factors account for the hysteresis exhibited by the graph of FIG. 2B.

Figure 3:
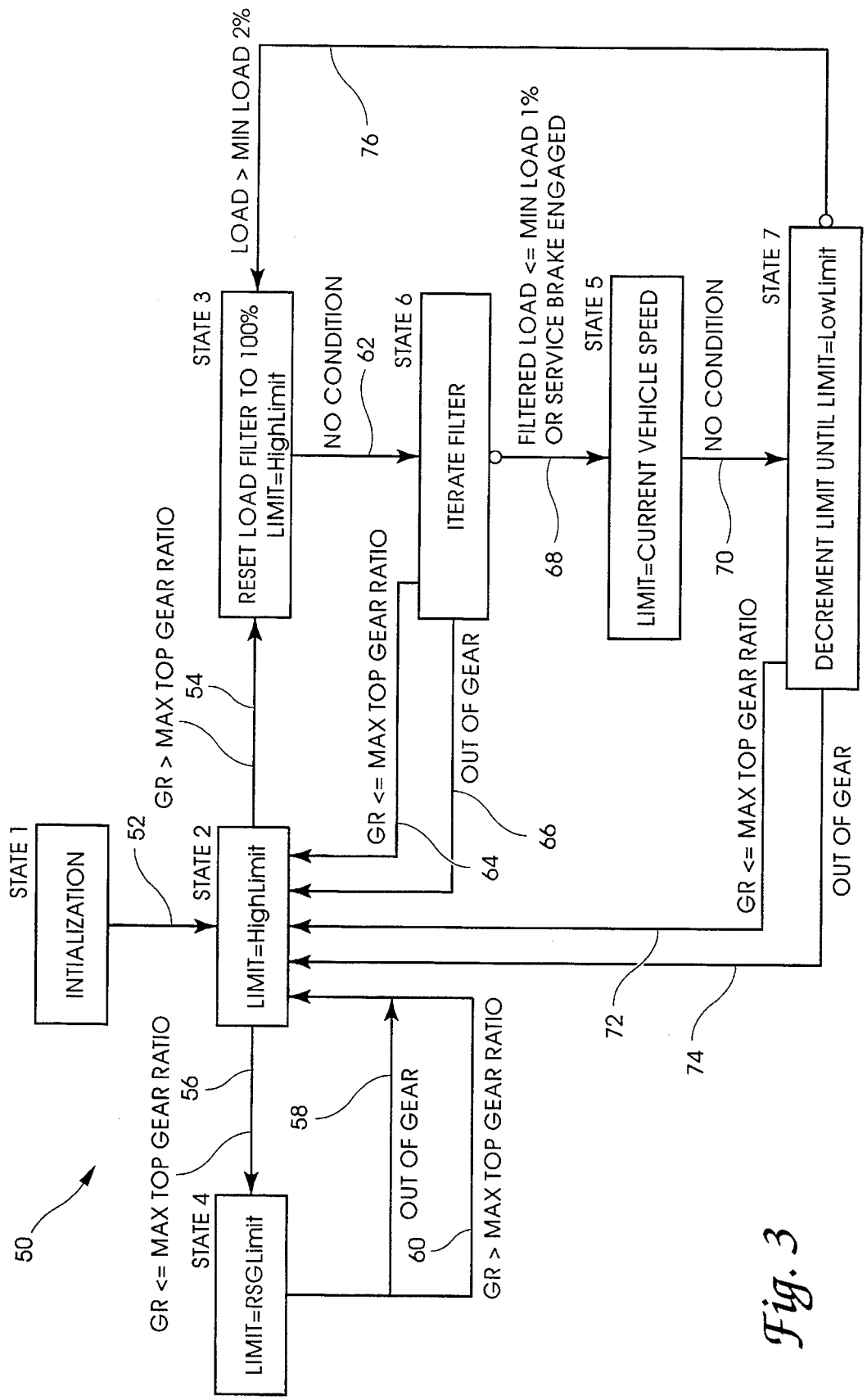
FIG. 3 is a state machine diagram of the control system of the present invention.

This hysteresis effect will be better understood with reference to FIG. 3, in which there is illustrated a state diagram for the control system of the present invention, indicated generally at 50. The state diagram 50 has seven states which are summarized as follows:

State 1

The control system is activated at engine startup, system variables are initialized, and initial readings are taken of the system sensor inputs. The system then proceeds to state 2 via path 52.

State 2

The vehicle speed limit (Limit) is set to the High Limit value, which is a constant selected by the vehicle owner and programmed into the control system using a special tool not avilable to the driver. The High Limit value is equal to the maximum allowable vehicle road speed when not in top gear. State 2 may be exited by one of two paths. If the vehicle gear ratio currently selected by the driver (via the transmission) is greater than the maximum top gear ratio plus a predetermined tolerance (i.e. a non-top gear has been selected (gear down operation)), the system proceeds to state 3 via path 54. On the other hand, if the vehicle gear ratio is less than or equal to the maximum top gear ratio (i.e. top gear has been selected), the system proceeds to state 4 via path 56. During the time when the control system is in state 2, the vehicle speed is limited to the High Limit value.

State 3

The control system enters state 3 only when the transmission is not in top gear (gear down operation). The present invention makes several decisions based upon the percent of maximum engine torque requested (load percentage). The load percentage is measured, for example, as the current amount of fuel going to the engine as a percentage of the maximum amount of fueling. This amount is filtered by a load filter in order to smooth out any rapid fluctuations. This load filter therefore converts between the actual instantaneous load percentage and the trend in the load percentage (see state 6). In situations where the fueling is steady state, the filtered load percentage converges with the instantaneous load percentage. In state 3, therefore the load filter is reset to indicate a filtered load of 100%. Additionally, the vehicle speed limit (Limit) is set equal to the High Limit value. State 3 is unconditionally exited via path 62 to state 6.

State 4

The control system remains in state 4 as long as the driver has selected the top gear. In state 4, the vehicle speed limit (Limit) is set to the road speed governor limit (RSG Limit) value, which is a constant selected by the vehicle owner and programmed into the control system. The RSG limit value is equal to the maximum allowable vehicle road speed in top gear. The vehicle speed limit in state 4 is illustrated graphically in FIG. 2A.

State 4 is only exited upon the occurance of one of two conditions. First, if the transmission is taken out of gear (neutral), the control system returns to state 2 via path 58. An out-of-gear condition is determined by the occurance of a rapid change in the calculated gear ratio. Secondly, if the transmission is shifted out of top gear (gear down operation), the control system returns to state 2 via path 60.

State 5

State 5 is only entered via path 68 when the driver is not in top gear and the driver is not requesting a high load percentage (as indicated by filtered load<=MIN_LOAD1%). This means that the driver is attempting to operate in a non-top gear (gear down operation) for an extended period of time. Because gear down operation at high road speeds is desired only in high load conditions, such as downshifting to climb an uphill grade or accelerating with the goal of upshifting, the control system attempts to encourage the driver to upshift by taking away road speed (in state 7). In preparation for this (to ensure no discontinuity), the vehicle speed limit (Limit) is set equal to the current vehicle speed. Typically, the current vehicle speed will be slightly lower than the High Limit, due to the vehicle decelerating after the requested load percentage has decreased. This is illustrated in FIG. 2B as the load based return path. The control system then unconditionally moves to state 7 via path 70.

State 6

State 6 is always entered from state 3 via path 62, and this transition is unconditional. The load filter is iterated at state 6 according to the following filter equation:

$$f_n = [LOAD\%_n * \alpha] + [f_{n-1} * (1-\alpha)]$$

where $f_n$=the new (iterated) filtered load $f_{n-1}$=the filtered load before the current iteration LOAD %=the current instantaneous load percentage as measured by fueling to the engine with respect to the maximum allowed at the current r.p.m.

$\alpha$=a predetermined scaling factor

It will be appreciated by those skilled in the art that is LOAD % remains constant, then the filtered load will remain constant and equal to LOAD %. However, if LOAD % changes, the effect of this change upon the next iteration of the filtered load is determined by the predetermined scaling factor $\alpha$. The larger the value of $\alpha$, the more impact any instantaneous change in LOAD % will have on the filtered load value. However, with $0<\alpha<1$ the filtered load will always eventually converge to the LOAD % if the engine fueling is held at a steady state position. The value of the scaling factor $\alpha$ determines how fast these two values will converge. On the other hand, if the accelerator pedal position is constantly changing, the filtered load will converge on the average requested load percentage.

State 6 may be exited by one of three paths. First, if the vehicle gear ratio is less than or equal to the maximum top gear ratio plus a predetermined tolerance (i.e. top gear has been selected), the system proceeds to state 2 via path 64. Secondly, if the transmission is shifted out of gear (neutral), the control system returns to state 2 via path 66. An out-of-gear condition is determined by the occurance of a rapid change in the measured gear ratio. Finally, if the filtered load is less than or equal to the predetermined variable MIN_LOAD1%, or if the service brake has been engaged (as indicated by an appropriate sensor), the control system moves to state 5 via path 68. Path 68 is the lowest priority transition (as indicated by the circle in FIG. 3), therefore this condition is evaluated after the first two exit conditions have been evaluated. MIN_LOAD1% may be set at, for example, 85% and is the point at which it is determined that the driver is not in a high load driving situation (and thus no longer in a transient situation), therefore the control system moves to states 5 and 7 in order to take away road speed in order to encourage the driver to shift into top gear.

It will be appreciated by those skilled in the art that the control system will remain in state 6 as long as a non-top gear is selected, the requested load percentage is above MIN_LOAD1%, the service brake is not engaged and the vehicle is in gear. State 6 therefore represents a legitimate non-top gear, high road speed transient driving condition.

State 7

State 7 is only entered when the controller is encouraging the driver to upshift due to the inherent steady state condition about to occur. In order to encourage the driver to shift into top gear, the vehicle speed limit (Limit) is ramped from High Limit to Low Limit. By taking away road speed, the driver is prevented from operating at high road speeds in non-top gears. As with High Limit, the Low Limit value is pre-programmed into the control system.

If Limit were immediately set equal to Low Limit in state 7, the road speed governor would abruptly cut the fuel supply to the engine, resulting in an unpleasant driver perception. The value of Limit is therefore slowly decremented in state 7 at a predetermined rate until it reaches Low Limit. As the vehicle begins to lose road speed, the driver is thereby encouraged to shift into top gear, where he may operate at any speed less than or equal to the RSG Limit. This gradual reduction in vehicle road speed is illustrated as the time based return path of FIG. 2B.

State 7 may be exited by one of three paths. First, if the vehicle gear ratio is less than or equal to the maximum top gear ratio plus a predetermined tolerance (i.e. top gear has been selected), the system proceeds to state 2 via path 72. Secondly, if the transmission is shifted out of gear (neutral), the control system returns to state 2 via path 74. An out-of-gear condition is determined by the occurance of a rapid change in the calculated gear ratio. Finally, if the filtered load is greater than the predetermined variable MIN_LOAD2%, the control system moves to state 3 via path 76. Path 76 is the lowest priority transition, therefore this condition is evaluated after the first two exit conditions are evaluated. MIN_LOAD2% is greater than MIN_LOAD1%, and may be set at, for example, 90%. MIN_LOAD2% is the point at which it is determined that the driver is once again in a high load driving situation in which operation in a lower gear is appropriate. Therefore, the control system moves to state 3 in order to reset Limit to High Limit and to begin monitoring for continued legitimate gear down operation.

It will be appreciated by those skilled in the art that the present invention, as represented in a preferred embodiment as the state diagram of FIG. 3, may be implemented as a software routine which is executable by the control system hardware of the vehicle. The control system hardware configuration is not critical to the concepts of the present invention, and may preferably be implemented with any suitable microprocesser and associated peripheral hardware, as is notoriously well known in the art.

Figure 4:
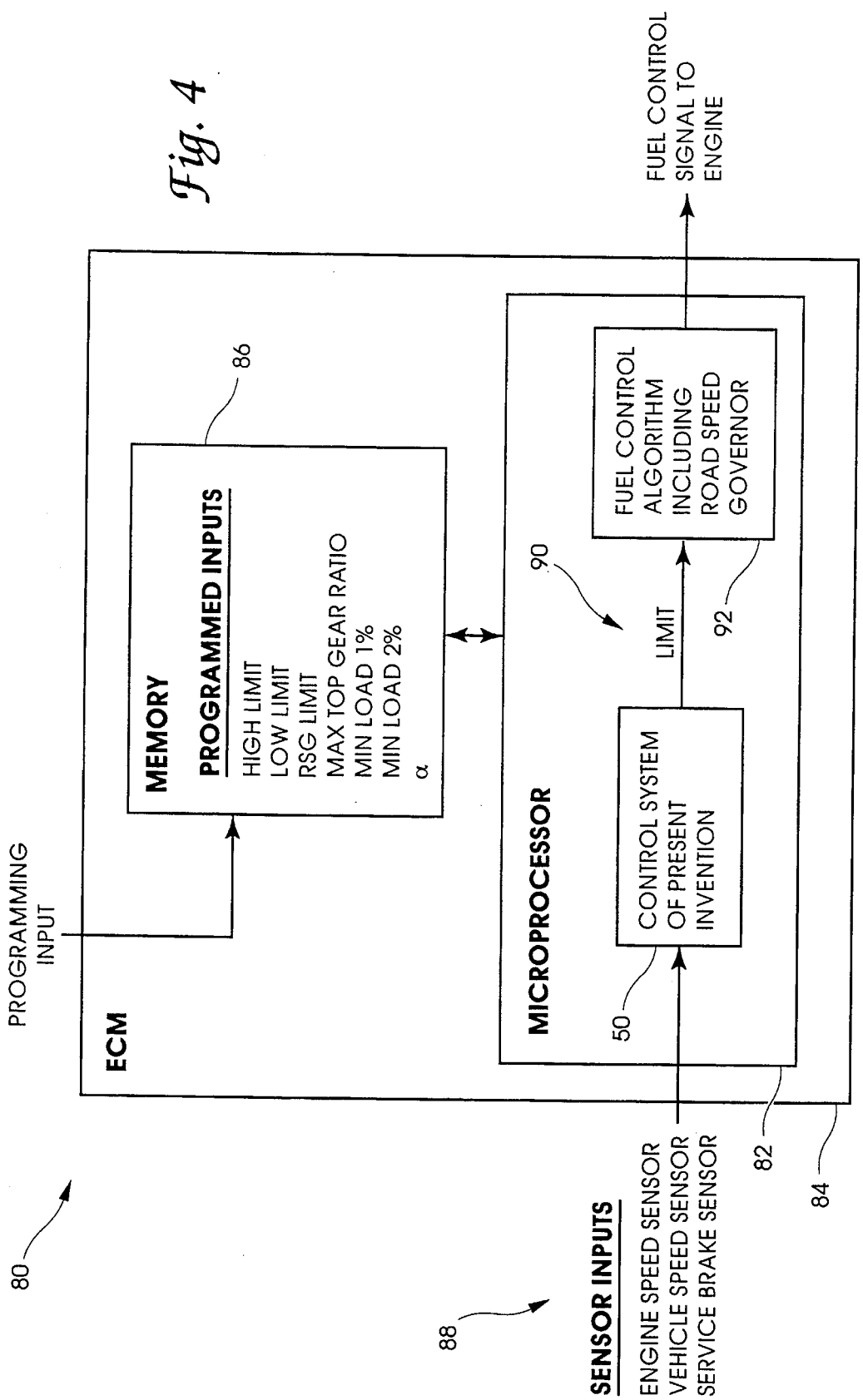
FIG. 4 is a schematic diagram of a preferred embodiment apparatus of the present invention.

For example, a preferred embodiment apparatus of the present invention is illustrated schematically in FIG. 4, and indicated generally at 80. The state diagram of FIG. 3 is implemented as a software routine which runs on the microprocessor 82. The microprocessor 82 may be any processing device, and may be included in any electronic control module (ECM) 84 commonly used for automotive control systems. The ECM 84 is configured with several programmed inputs 86 as illustrated in FIG. 4. The microprocessor 82 additionally receives several inputs from external sensors 88, as illustrated in FIG. 4. These sensors meaure the condition of remote portions of the vehicle and relay this information to the ECM 84 and hence the microprocessor 82. The sole output of the control routine of the present invention is the value of Limit 90, which is used as an input by the road speed governor 92 in order to determine if the fuel supply to the engine should be limited.

It will be appreciated by those skilled in the art that the apparatus illustration of FIG. 4 is highly schematic. For example, the road speed governor will typically be implemented as another software routine running on the microprocessor 82, therefore the output Limit will not be a physical output from the microprocessor 82, but will rather be a value transferred from the routine of the present invention to the road speed governor routine 92, internal to the microprocessor 82.

It will be further appreciated by those skilled in the art that the gear ratio values used by the present invention may be sensed or calculated in a variety of way. In a preferred embodiment of the present invention, the gear ratios are calculated by sensing engine speed and the speed of the rear axle. With the rear axle speed (and knowning the rear differential gear ratio and the vehicle tire size, which are programmed inputs), the vehicle road speed may be calculated. The gear ratio may then be calculated as the ratio between the engine speed and the road speed.

While the invention has been illustrated and described in detail in the drawings and foregoing description, the same is to be considered as illustrative and not restrictive in character, it being understood that only the preferred embodiment has been shown and described and that all changes and modification that come within the spirit of the invention are desired to be protected.

What is claimed is:

1. A method for gear down operation prevention in a vehicle having a drive train including an internal combustion engine and a manual transmission, comprising the steps of:
   (a) determining if a numerically lowest gear ratio of the manual transmission is currently selected;
   (b) determining a load percentage of the engine;
   (c) determining if the load percentage of the engine is below a predetermined threshold;
   (d) reducing a road speed limit of the vehicle if the numerically lowest gear ratio is not currently selected and the requested load percentage is below the threshold;
   (e) determining a road speed of the vehicle; and
   (f) reducing the road speed of the vehicle if the road speed is above the road speed limit.

2. The method of claim 1, wherein step (a) further comprises the steps of:
   (a.1) determining an engine speed of the engine; and
   (a.2) calculating the currently selected gear ratio from the engine speed and the road speed.

3. The method of claim 1, wherein step (b) comprises calculating an instantaneous amount of fueling to the engine as a percentage of a maximum amount of fueling allowed at a current engine speed.

4. The method of claim 1, wherein step (d) comprises decreasing a maximum allowed vehicle speed limit input to a road speed governor of the vehicle.

5. The method of claim 1, wherein step (b) further comprises the steps of:
   (b.1) calculating an instantaneous load percentage of the engine; and
   (b.2) filtering the instantaneous load percentage of the engine to obtain the load percentage of the engine.

6. The method of claim 5, wherein step (b.2) is performed according to the filter equation:

$$f_n = [\text{LOAD }\%_n * \alpha] + [f_{n-1} * (1-\alpha)]$$

where $f_n$ is the load percentage of the engine at an instant n, LOAD $\%_n$ is the instantaneous load percentage of the engine at the instant n, $\alpha$ is a predetermined scaling factor, and $f_{n-1}$ is the load percentage of the engine at an instant n-1 prior to the instant n.

7. A method for gear down operation prevention in a vehicle having a drive train including an internal combustion engine and a manual transmission, comprising the steps of:
   (a) determining if a numerically lowest gear ratio of the manual transmission is currently selected;
   (b) determining a load percentage of the engine;
   (c) filtering the load percentage to obtain a filtered load percentage, wherein the filtered load percentage is a weighted average of the load percentage over a period of time;
   (d) determining if the filtered load percentage is below a first predetermined threshold;
   (e) reducing a road speed limit of the vehicle by a predetermined amount if the numerically lowest gear ratio is not currently selected and the filtered load percentage is below the first threshold;

(f) determining a road speed of the vehicle;

(g) reducing the road speed of the vehicle if the road speed is above the road speed limit;

(h) further reducing the road speed limit of the vehicle by the predetermined amount; and (i) repeating steps (f–h) until the road speed limit of the vehicle reaches a predetermined limit speed.

8. The method of claim 7, further comprising the steps of:

(j) repeating steps (a), (b) and (c);

(k) determining if the filtered load percentage is above a second predetermined threshold; and (l) ceasing step (i) if the numerically lowest gear ratio is not currently selected and the filtered load percentage is above the second threshold.

9. The method of claim 7, wherein step (a) further comprises the steps of:

(a.1) determining an engine speed of the engine; and (a.2) calculating the currently selected gear ratio from the engine speed and the road speed.

10. The method of claim 7, wherein step (b) comprises calculating an instantaneous amount of fueling to the engine as a percentage of a maximum amount of fueling allowed at a current engine speed.

11. The method of claim 7, wherein step (e) comprises decreasing a maximum allowed vehicle speed limit input to a road speed governor of the vehicle.

12. The method of claim 7, wherein the load percentage is an instantaneous load percentage.

13. The method of claim 7, wherein step (c) is performed according to the filter equation:

$$f_n = [\text{LOAD }\%_n * \alpha] + [f_{n-1} * (1-\alpha)]$$

where $f_n$ is the load percentage of the engine at an instant n, LOAD $\%_n$ is the instantaneous load percentage of the engine at the instant n, $\alpha$ is a predetermined scaling factor, and $f_{n-1}$ is the load percentage of the engine at an instant n-1 prior to the instant n.

14. The method of claim 8, wherein the first predetermined threshold is less than the second predetermined threshold.

15. An apparatus for gear down operation prevention in a vehicle having a drive train including an internal combustion engine and a manual transmission, comprising:

gear ratio means for determining if a numerically lowest gear ratio of the manual transmission is currently selected;

load percentage means for determining a load percentage of the engine;

means for determining if the load percentage of the engine is below a predetermined threshold;

means for reducing a road speed limit of the vehicle if the numerically lowest gear ratio is not currently selected and the requested load percentage is below the threshold;

means for determining a road speed of the vehicle; and means for reducing the road speed of the vehicle if the road speed is above the road speed limit.

16. The apparatus of claim 15, wherein the gear ratio means comprises:

means for determining an engine speed of the engine;

means for determining a vehicle speed of the vehicle; and means for calculating the currently selected gear ratio from the engine speed and the vehicle speed.

17. The apparatus of claim 15, wherein the load percentage means comprises a sensor operative to calculate an instantaneous amount of fueling to the engine as a percentage of a maximum amount of fueling allowed at a current engine speed.

18. The apparatus of claim 15, wherein the means for reducing comprises means for decreasing a maximum allowed vehicle speed limit input to a road speed governor of the vehicle.

19. The apparatus of claim 15, wherein the load percentage means comprises:

a sensor operative to calculate an instantaneous load percentage of the engine; and a filter operative to filter the instantaneous load percentage of the engine to obtain the load percentage of the engine.

20. The apparatus of claim 19, wherein the filter implements the filter equation:

$$f_n = [\text{LOAD }\%_n * \alpha] + [f_{n-1} * (1-\alpha)]$$

where $f_n$ is the load percentage of the engine at an instant n, LOAD $\%_n$ is the instantaneous load percentage of the engine at the instant n, $\alpha$ is a predetermined scaling factor, and $f_{n-1}$ is the load percentage of the engine at an instant n-1 prior to the instant n.

* * * * *

UNITED STATES PATENT AND TRADEMARK OFFICE
CERTIFICATE OF CORRECTION

PATENT NO. : 5,564,999

DATED : October 15, 1996

INVENTOR(S) : Steven M. Bellinger, et al.

It is certified that error appears in the above-identified patent and that said Letters Patent is hereby corrected as shown below:

In column 1, line 25, please change "the", first occurrence, to --this--.
In column 2, line 3, please change "speed" to --speeds--.
In column 4, line 8, please change "hear" to --gear--.
In column 6, line 10, please change "is" to --if--.
In column 7, line 58, please change "way" to --ways--.
In column 8, line 4, please change "modification" to --modifications--.

Signed and Sealed this

Twenty-fifth Day of March, 1997

Attest:

BRUCE LEHMAN

Attesting Officer         Commissioner of Patents and Trademarks